United States Patent [19]
Burgess

[11] Patent Number: 5,529,231
[45] Date of Patent: Jun. 25, 1996

[54] ADJUSTABLE CAR CARRIER

[75] Inventor: Ronald J. Burgess, Dominguez Hills, Calif.

[73] Assignee: Red Rock Industries, Parawan, Utah

[21] Appl. No.: 257,911

[22] Filed: Jun. 10, 1994

[51] Int. Cl.$^6$ .................................. B60R 9/10; B60R 9/06
[52] U.S. Cl. ....................... 224/502; 224/523; 224/536; 224/924; 224/282; 248/592
[58] Field of Search ........................ 211/5, 17, 18; 224/42.03 A, 42.03 B, 42.03 R, 42.04, 42.07, 42.21, 282, 502, 521, 523, 522, 519, 533, 536, 924; 248/291, 561, 592; 267/46.11

[56] References Cited

U.S. PATENT DOCUMENTS

| | | |
|---|---|---|
| 2,676,720 | 4/1954 | Noble . |
| 2,685,913 | 8/1954 | Schlueter .............................. 248/592 |
| 3,301,421 | 1/1967 | Lutters . |
| 3,877,622 | 4/1975 | McLain ........................... 224/42.03 B |
| 3,894,643 | 7/1975 | Wilson . |
| 4,298,151 | 11/1981 | O'Connor ............................. 224/329 |
| 4,400,129 | 8/1983 | Eisenberg et al. ..................... 412/462 |
| 4,573,854 | 3/1986 | McFarland . |
| 4,676,413 | 6/1987 | Began et al. . |
| 4,676,414 | 6/1987 | Deguevara . |
| 4,682,749 | 7/1987 | Strater .................................... 248/592 |
| 4,887,754 | 12/1989 | Boyer et al. ............................. 211/17 |
| 5,050,785 | 9/1991 | Hays ..................................... 224/532 |
| 5,056,700 | 10/1991 | Blackburn et al. ..................... 224/324 |
| 5,092,503 | 3/1992 | Cocks .................................. 224/42.07 |
| 5,108,018 | 4/1992 | Spinka .......................... 224/42.03 R |
| 5,190,195 | 3/1993 | Fullhart et al. . |
| 5,209,628 | 5/1993 | Hassell . |
| 5,259,542 | 11/1993 | Newbold et al. ....................... 224/324 |
| 5,303,857 | 4/1994 | Hewson ......................... 224/42.03 B |

FOREIGN PATENT DOCUMENTS

| | | | |
|---|---|---|---|
| 2686051 | 7/1993 | France .................................. 224/520 |

Primary Examiner—Henry J. Recla
Assistant Examiner—Gregory Vidovich
Attorney, Agent, or Firm—Blakely, Sokoloff, Taylor & Zafman

[57] ABSTRACT

A carrier attached to a vehicle to enable articles such as bicycles to be transported. The carrier comprising an article support member rotatably coupled to a substantially horizontal base member. The base member is designed to be securely inserted within a standard hitch receiver commonly found on many vehicles. The article support member includes a support column oriented in a generally vertical direction and a holding member generally perpendicular to said support column for securing the articles. The carrier further comprises a resistive member coupled to the article support member and the base member to drastically lessens the rotational speed of the article support member during unloading of the article and accessing of a rear hatch door of the vehicle.

20 Claims, 3 Drawing Sheets

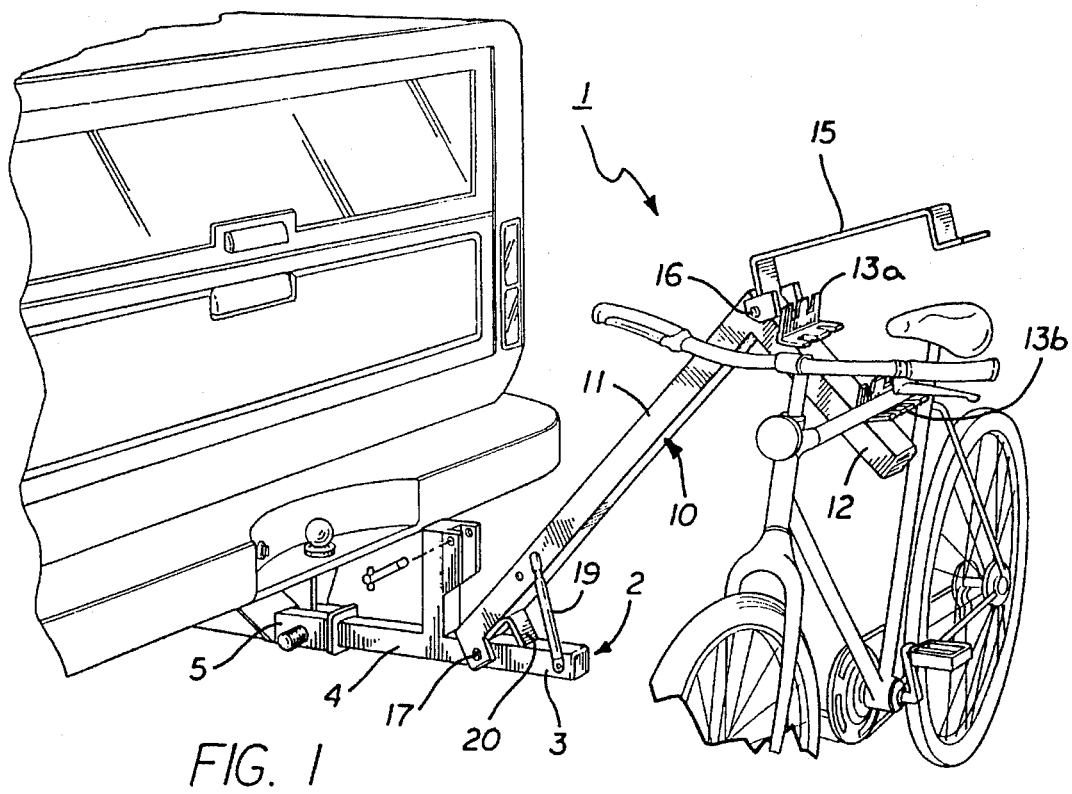
FIG. 1
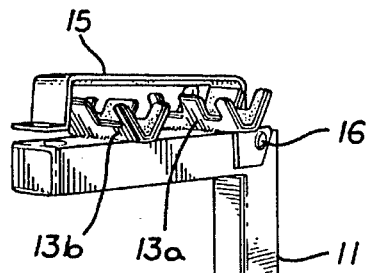
FIG. 2
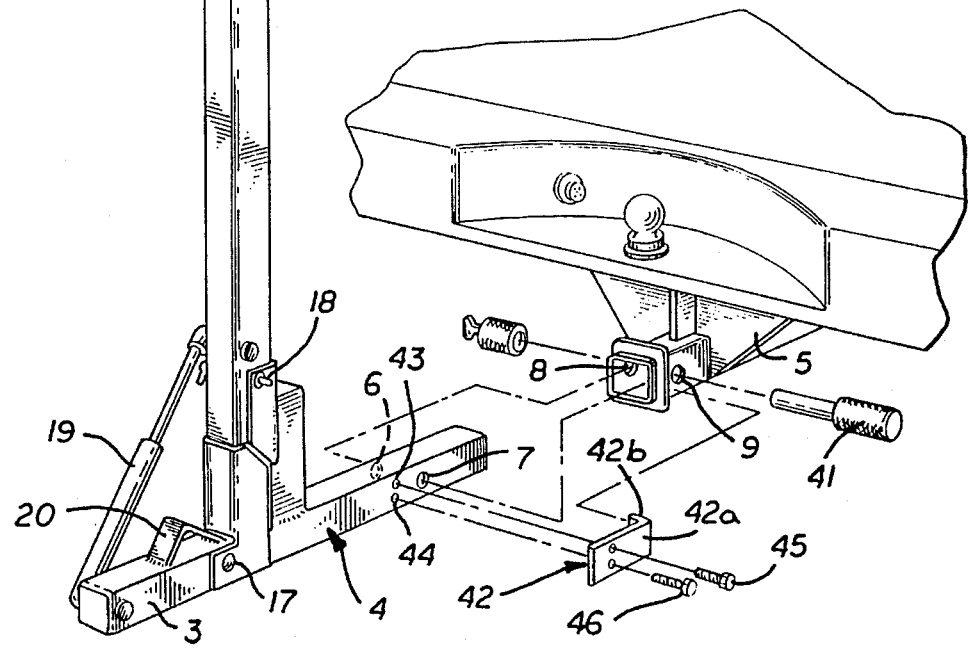

ADJUSTABLE CAR CARRIER

BACKGROUND OF THE INVENTION

1. Field of the Invention

The present invention relates to an adjustable carrier attached to a vehicle for securing various articles such as bicycles, skis, wheelchairs and the like. More particularly, the present invention relates to the adjustable carrier capable of being slowly rotated downward toward the ground in order to facilitate loading and unloading of the articles and to gain access to a rear entry of the vehicle.

2. Background of the Field

It is commonly known that carriers, particularly bicycle racks, have been designed to be secured in a detachable manner to a conventional hitch receiver mounted on the vehicle. Such carriers typically employ a rectangular shaped tube that is inserted into a rectangular trailer hitch receiver mounted to the vehicle. One such conventional bicycle rack is disclosed in U.S. Pat. No. 4,646,414 to Deguevara. This bicycle rack employs a L-shaped clamp member that has a telescopic vertical portion, which is received within a tube or slide member secured to the back of a vertical column of the rack. The bicycles are disposed on a hook-like portion and secured on the L-shaped clamp member. However, this type of bicycle rack affords many disadvantages, among which is that it was cumbersome to use because it had no pivoting mechanism to facilitate easy loading and unloading of the bicycles as well as easy access to the vehicle. Another disadvantage is that it is unstable during transport and provides little security since it is quite easy to bend the hook-like portion.

Another conventional bicycle rack is shown in U.S. Pat. No. 5,190,195, issued to Fullhart et al. (hereinafter referred to as the "'195 patent"). This bicycle rack discloses a base assembly, a vertical support and a crossbar assembly. The vertical support is pivotally connected to the base assembly through a first pull-pin locking mechanism which, when removed, allows the vertical support to freely rotate downward about a ninety-degree angle. Similarly, the crossbar assembly is pivotally connected to the vertical support through a second pull pin locking mechanism. A pair of hook rods extends outward from the outer ends of the crossbar assembly for supporting either one or two bicycles. Each of these hook rods has a threaded end which is inserted through a corresponding aperture at the outer ends of the crossbar and are held in place through nuts. This conventional rack has several disadvantages of which the present invention has overcome.

A first disadvantage is related to the manner in which the bicycles are supported. In the '195 patent, the bicycles are supported by the pair of hook rods coupled to the assembly through a conventional nut/bolt locking mechanism. During normal transportation, these hook rods tend to become bent in a downward sloping direction due to forces being exerted thereon; namely, a gravitational force associated with the weight of the bicycles in combination with additional forces caused by oscillation of the bicycles as the vehicle experiences common bumps and indentations during transport. In rough terrain, the additional forces exerted on the pair of hook rods could substantially bend the hook rods, and possibly in some cases, cause the hook rods to break, resulting in damage to the bicycles or worse yet, in injury to passing motorists and pedestrians.

Another disadvantage associated with the bicycle rack illustrated in the '195 patent is that no safety mechanism is employed to protect persons or property from harm in the event that the first pull-pin becomes inadvertently dislodged. For example, a curious child may easily remove the pull-pin causing the vertical support, in combination with one or two bicycles, to come crashing downward injuring the child. It is evident that there existed no mechanism which applies force directly against the supporting member in order allow such supporting member to be slowly rotated downward at an approximately 90° to its normal upright position or, better yet to be positioned at an angle less than 90° from the upright position for easier removal of the bicycles.

A further disadvantage is that the conventional bicycle rack has no security features to prevent theft of the bicycles while mounted on the conventional bicycle rack. Anyone could quickly remove the second pull-pin holding a clamping arm in place, raise the clamping arm and remove the bicycles in a few moments. Hence, it would be desirous to create a carrier which eliminates the above disadvantages.

SUMMARY OF THE INVENTION

In light of the foregoing, it can be appreciated that there exists a bona fide need for a theft-resistant adjustable carrier which is slowly pivotable and less susceptible to damage due to the weight and bouncing of the bicycles during transport. Accordingly, it would be a great advantage and therefore an object of the present invention to provide a carrier that is slowly rotated in a downward direction only if force is applied in the same rotational downward direction.

It is also an object of the present invention to provide a carrier that securely supports articles during transport without an appreciable risk of breakage or damage during transport.

It is another object of the present invention to provide a carrier which is securely locked to prevent theft of the articles when the vehicle is stationary.

Yet another object of the present invention is to provide a carrier which provides access to the rear of the vehicle without removing the carrier and/or the articles secured thereto.

The present invention is a carrier comprising an article support member rotatably coupled to a substantially horizontal base member. The base member is designed to be securely inserted within a standard hitch receiver generally mounted to sport utility vehicles, trucks, minivans and other types of vehicles. The article support member includes a vertical support column and a generally horizontal holding member to which various articles are fastened. In order to prevent abrupt and consequentially dangerous downward rotation of the article support member, a resistive member is coupled to the article support member and the horizontal base member. The resistive member drastically lessens normal rotational speed of the article support member during possible unloading of the article and access to the vehicle through a rear hatch door.

BRIEF DESCRIPTION OF THE DRAWINGS

The objects, features and advantages of the present invention will become apparent from the following detailed description of the present invention in which:

FIG. 1 is a prospective view of the first embodiment of the adjustable carrier mounted to a trailer hitch receiver wherein the support member rotated downward in order to facilitate easy loading and unloading of the article.

FIG. 2 is another prospective view of the first embodiment of the adjustable carrier illustrating how the carrier is coupled to the trailer hitch receiver.

DETAILED DESCRIPTION OF THE INVENTION

Figure 3:
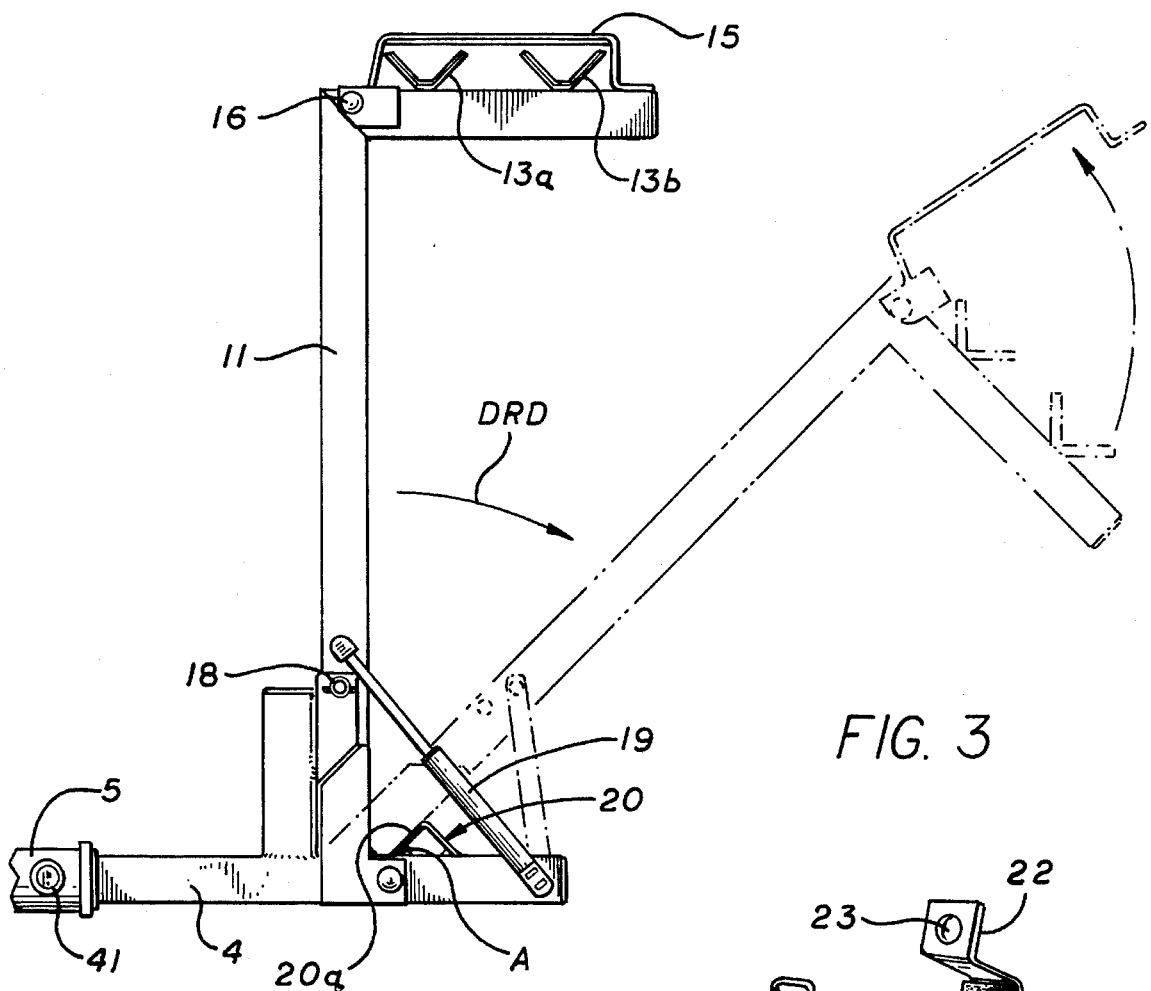
FIG. 3 is a plan view of the first embodiment showing the resistive member coupled to the base member and the support member in which a sufficient force needs to be applied in a direction parallel to the downward rotational direction to rotate the support member.

The present invention describes an adjustable carrier detachably mounted to a vehicle through a hitch receiver of the vehicle. In the following detailed description, numerous specific details are set forth, such as the specific pressure within a resistive member to prevent abrupt and unwanted downward rotation. Such details are used to provide a thorough understanding of the present invention. However, it is apparent to one skilled in the art that the invention may be practiced without these details. In other instances, well known elements, components and the like are not set forth in detail in order to avoid unnecessary obscuring of the present invention. Although the present disclosure discusses a carrier for transporting bicycles, it is contemplated that the present invention can be designed to transport any type of article including skis, wheelchairs and the like.

Referring now to FIG. 1, a first embodiment of the adjustable carrier 1 mounted to a vehicle and positioned in a downward rotated position for removal of an article (e.g., a bicycle) to gain access to a rear of the vehicle is illustrated. The carrier 1 comprises a substantially horizontal base member 2 with an article support member 10 pivotally mounted to the base member 2. The base member 2 includes a stationary member 3 and a mounting insert 4 both protruding in opposite directions. The mounting insert 4 is capable of being inserted into a hitch receiver 5 in order to attach the carrier 1 to a vehicle. The mounting insert 4 is of sufficient width and length to be securely fastened with the hitch receiver 5. However, it is contemplated that the carrier 1 may be securely mounted to a rear bumper of the vehicle for transportation purposes or any stationary structure for use as a locking device.

The article support member 10 includes a support column 11 and a holding member 12 joined at a substantially right angle to each other. The holding member 12 is of a length in the range of twelve to twenty-four inches being capable of preferably supporting two bicycles, but it is contemplated that the holding member 12 could be designed to support a plurality of skis, a wheelchair and any other similar articles. A pair of article stabilizers 13a and 13b are mounted onto the holding member 12 in order to securely maintain a frame of a bicycle as illustrated to prevent sliding during transport, but it is further contemplated that only one or more than two article stabilizers may be used.

Figure 4:
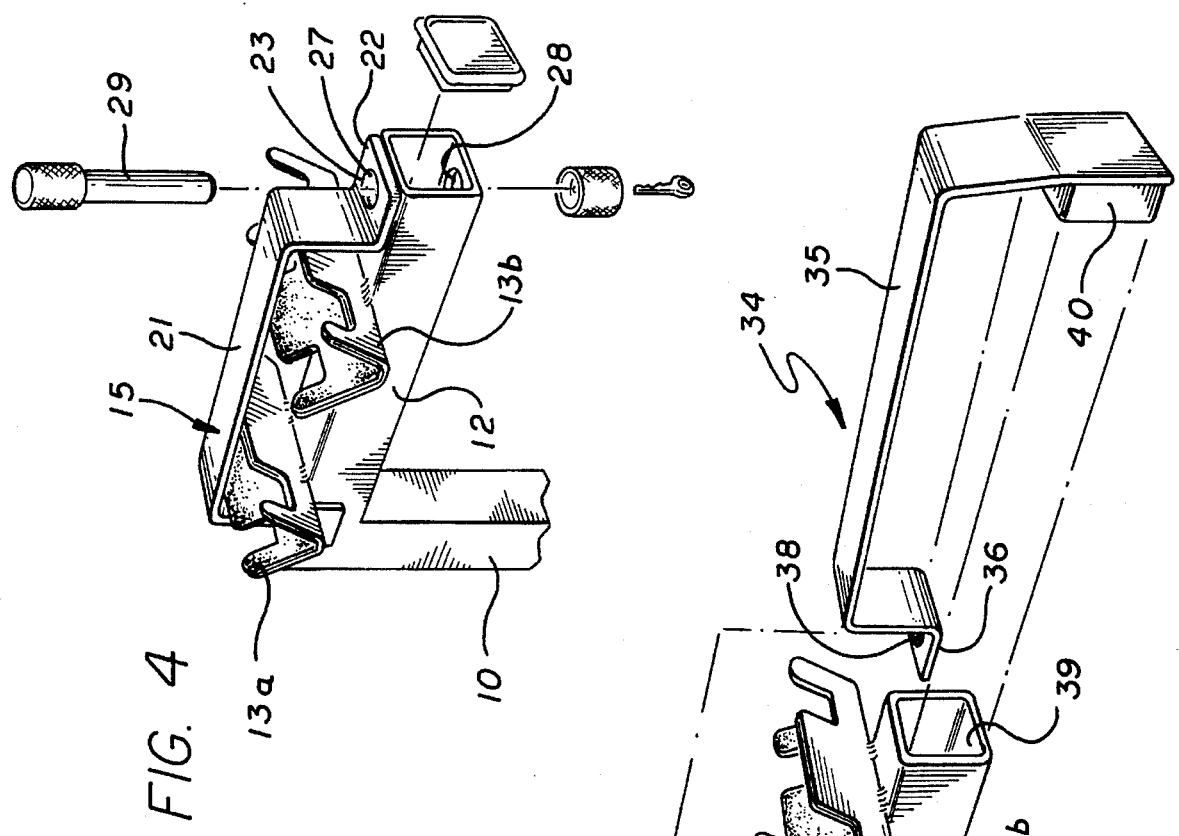
FIG. 4 is a prospective view of the first embodiment of the adjustable carrier fastening an article to a resting plate of the holding member.

A securing member 15 is pivotally coupled to the article support member 10 through a locking mechanism such as a first locking bolt 16. The first locking bolt 16 is a bolt having nuts permanently fastened thereto. The securing mechanism 15 is U-shaped having a sufficient height to enable it to completely enclose the article stabilizers 13a and 13b when the securing mechanism 15 is in a closed position as illustrated in FIGS. 2–4 respectively.

The article support member 10 is pivotally coupled to the base member 2 by a second locking bolt 17, allowing the article support member 10 to be rotated downward along a plane including the support column 11 by removing a pull-pin 18 and applying an external force (e.g., pushing or pulling) in a direction generally parallel to this downward rotation direction. The article support member 10 is maintained in an upright position by the second locking bolt 17 in combination with the pull-pin 18. Upon removing the pull-pin 18, the support member 10 remains in the upright position through a resistive member 19 applying a force against the support column 11, thereby preventing the article support member 10 from being rotated within the plane.

The resistive member 19 is coupled to the stationary member 3 and to the support column 11 of the article support member 10 so as to generally form a right triangle. By applying the external force along the plane, the article support member 10 can be downwardly and upwardly rotated in a safe and slow manner. Moreover, a stopping device 20 can be mounted onto the stationary member 3 in order to limit the downward rotational angle of the article support member 10. The purpose of the stopping device 20 is three-fold. First, it protects mounting hardware of the resistive member from unwanted stress. Secondly, its placement allows the article support member 10 to be rotated sufficiently to enable one to gain access to the rear of the vehicle or unload the articles. Finally, it prevents injury or damage to articles that may be caused by the pull-pin being inadvertently removed.

Referring now to FIG. 2, a more-detailed prospective view of the mounting of the carrier 1 to the hitch receiver 5 is illustrated. In order to provide a more reliable attachment, the mounting insert 4 includes an opposite pair of insert apertures 6 and 7 corresponding in diameter and distance to an opposite pair of apertures 8 and 9 normally pre-drilled within conventional hitch receivers. In the absence of the pre-drilled receiver apertures 8 and 9, the hitch receiver 5 can be easy modified through drilling such receiver apertures 8 and 9.

The mounting insert 4 is first inserted into the hitch receiver 5 between six to twelve inches so that the insert apertures 6 and 7 and the receiver apertures 8 and 9 are aligned. Then, a locking mechanism, such as a deadbolt 41, is inserted through both the insert and receiver apertures 6–9 and fastened accordingly in order to securely attach the carrier 1 and more specifically the mounting insert 4 to the hitch receiver 5.

Optimally, after insertion and attachment of the mounting insert 4 into the hitch receiver 5, an anti-sway bracket 42 is coupled to the mounting insert by two threaded apertures 43 and 44 in combination with two threaded screws 45 and 46. The anti-sway bracket 42 includes a generally "L" shaped bracket member in which a surface of a first portion 42a of the anti-sway bracket 42, when attached, rests against the mounting insert 4 and an edge of a second portion 42b of the bracket rests against the hitch receiver 5. By tightening the threaded screws, the anti-sway bracket 42 mitigates sliding of the carrier from side-to-side during transport.

Referring to FIG. 3, it illustrates the operation of the resistive member 19 in combination with the downward rotation of the article support member 10. After the pull-pin 18 is removed and the external force is applied along the plane as indicated by an arrow labeled "DRD", the article support member 10 is downwardly rotated until it comes into contact with the stopping device 20. The stopping device 20 is a triangular shaped device in which the angle between a front surface 20a of the stopping device 20 and a top surface of the stationary member 3 is equal to predetermined angle A, typically less than or equal to 45°. As a result, the rotation of the article support member 10 is restricted to an angle corresponding to 90° angle A which allows easier unloading of the articles being transported and provides rear access to the vehicle.

The resistive member 19 is typically a gas shock having a predetermined pressure having a range of 120–250 pounds per square inch ("psi") of pressure. In this embodiment, the predetermined pressure of the resistive member 19 is set preferably at 140 psi; however, it is contemplated that the resistive member 19 could apply greater or lesser pressure against the support column 11 depending on how much resistance is required in view of the weight of the articles supported thereon and any other forces being exerted thereon during transportation. The article support member 10 is pivotally mounted to the base member 2 through the second locking bolt 17 being drive rivets in combination with the pull-pin 18.

Referring now to FIG. 4, the securing mechanism 15 in the closed position is illustrated. The securing member 15 includes a C-shaped bracket member 21 and a horizontal bracket member 22 having an aperture 23 therein. The bracket member 21 is of sufficient length and height from the holding member 12 to secure articles positioned on the article stabilizers 13a and 13b as shown in FIG. 5.

The bracket member 21 is pivotally coupled to a first end of the holding member 12 while secured at a second end of the holding member 12. The bracket member 21 is secured to the holding member 12 by aligning the aperture 23 of the horizontal bracket member 22 with a pair of apertures 27 and 28 in the holding member 12, which is preferably hollow as illustrated, and inserting a locking mechanism 29, such as a deadbolt lock, therethrough. As a result, the securing mechanism 15 is placed in a locked, closed position until removal of the locking mechanism 29. This prevents theft of the articles when a vehicle is stationary or dislodging of the articles during transport. However, it is contemplated that a bore could be drilled through the holding member 12, provided that the holding member is solid.

Figure 5:
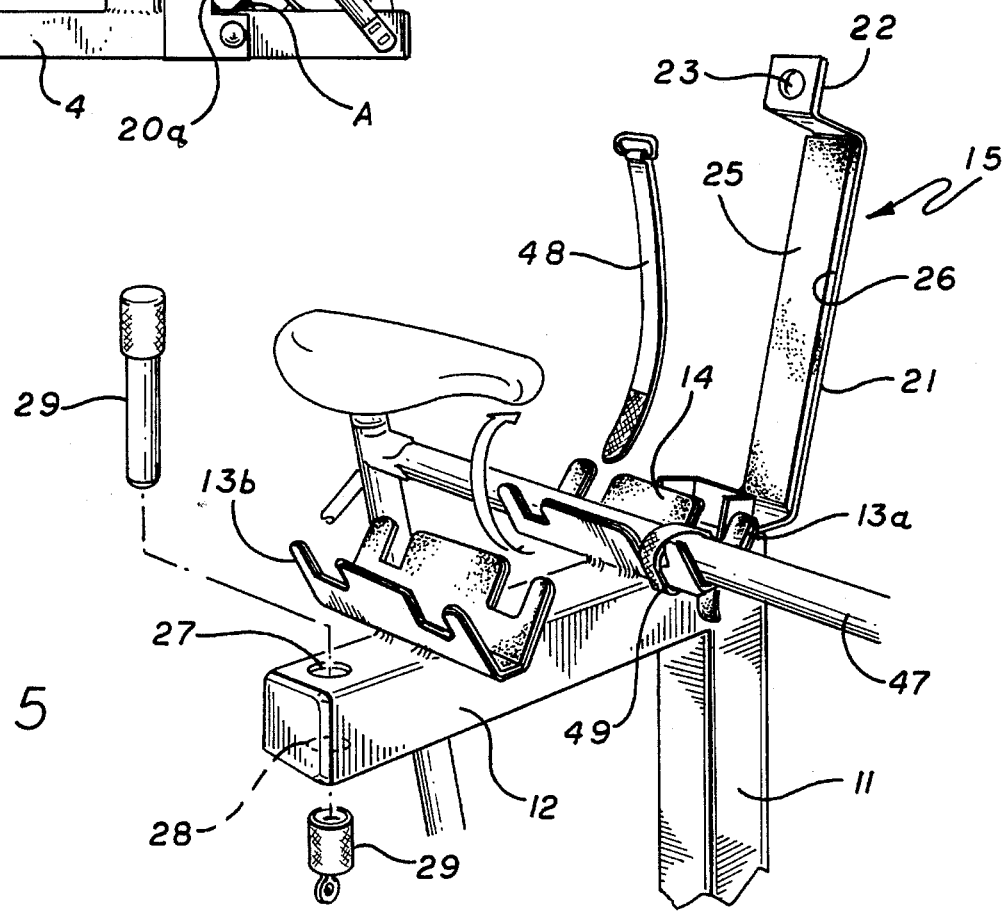
FIG. 5 is a prospective view of the holding member.

Referring now to FIG. 5, a bicycle 47 is being detachably secured to the article stabilizer 13a, wherein every article stabilizer preferably being a pair of resting plates joined to form a general V-shaped construction, by placing a frame of the bicycle 47 laterally across the article stabilizer 13a. Then, at least one, but preferably a pair of straps 48 and 49 are guided through slits of the article stabilizer 13a and wrapped around the bicycle's frame. The straps 48 and 49 are then fastened securely so that the bicycle 47 will not become partially dislodged and unstable during transport. The article stabilizers 13a and 13b and the bracket member 21 may also include padding (e.g., neoprene) 14 and 25, respectively along their respective interior surfaces in order to prevent scratching of the article during transportation. However, such padding 14 and 25 of either interior surface is not required.

Figure 6:
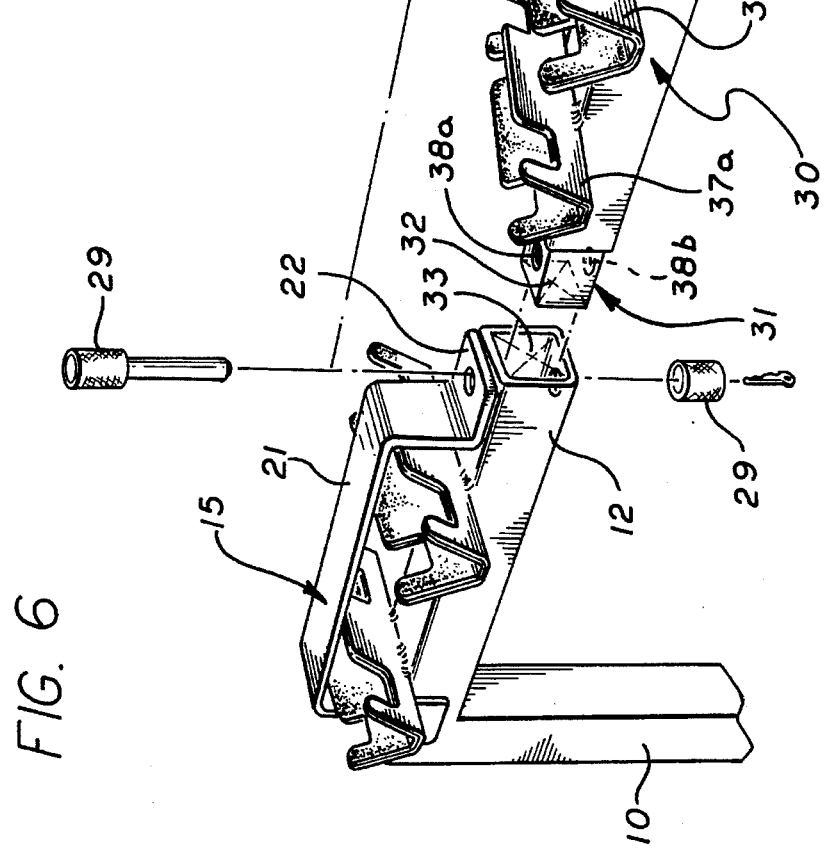
FIG. 6 is a prospective view of a second embodiment of the present invention incorporating a holding member extension coupled to the holding member.

In FIG. 6, a second embodiment of the present invention is shown, in which a holding member extension 30 is coupled to the holding member 12 of the article support member 10. Such coupling is achieved by the holding member extension 30 having an insert 31 with a cross-sectional area 32 less than a cross-sectional area 33 of the holding member 12, although it is contemplated that a person skilled in the art could design an extension such that its cross-sectional area is greater than the cross-sectional area of the holding member 12 for appropriate attachment. The holding member extension 30 further includes a second pair of article stabilizers 37a and 37b mounted on the extension 30 and a second pair of aligned apertures 38a and 38b.

A second securing mechanism 34, similar in look and function to the first securing mechanism 15 is coupled to the extension 30. The second securing mechanism 34 includes a second bracket member 35 raised from the extension at a height above the second pair of article stabilizers 37a and 37b and a second horizontal extension 36 having an aperture 38 to be aligned with the apertures of (i) the holding member 27 and 28, (ii) the first horizontal bracket member 23 and (iii) the extension 38a and 38b. After alignment, the locking mechanism 29 is placed therethrough to secure holding member extension 30 to the holding member 12. However, the second bracket member 35 of the holding member extension 30 is not pivotally coupled to the extension 30, but rather, it is secured to the extension 30 by inserting an end portion 40 of the second bracket member 35 into an open portion 39 of the holding member extension 30.

The present invention described herein may be designed in many different methods and using many different components while the present invention has been described in terms of various embodiments, other embodiments may come to mind to those skilled in the art without departing from the spirit and scope of the present invention. The invention should, therefore, be measure in terms of the claims which follow.

What is claimed is:

1. A carrier adapted for use with a vehicle having a receiver means for receiving the carrier, said carrier comprising:

mounting means for removably coupling said carrier to said vehicle, wherein said mounting means includes a horizontal member having a first end adapted to be inserted into the receiver means and a second end;

securing means for securing at least one article for transport, said securing means including support means, rotatably coupled to said mounting means intermediate to said first and second ends of said horizontal member, for supporting said at least one article during transport, and holding means for enclosing a portion of said at least one article to prevent removal of said at least one article from said carrier, said holding means being coupled to said support means; and resistive means for resisting rotation of said securing means between an upright position and a lowered position being at a predetermined angle to said upright position, a first end of said resistive means being coupled to said horizontal member between said support means and said second end of said horizontal member and a second end of the resistive means being coupled to said support means, wherein said resistive means applies a force directly against said support means to prevent said securing means from abruptly rotating downward from said upright position.

2. The carrier according to claim 1, wherein said first and second ends of said horizontal member are generally orthogonal to said support means.

3. The carrier according to claim 2, wherein said mounting means further includes a stopping device mounted onto said horizontal member to enable said support means to be rotated for a predetermined angle until it establishes contact with a front surface of said stopping device.

4. The carrier according to claim 3, wherein said predetermined angle is equal to ninety degrees minus angle A, where angle A is equal to an angle between the front surface of said stopping device and a top surface of said horizontal member.

5. The carrier according to claim 1, wherein said holding means includes a first holding member including at least one article stabilizer mounted onto said first holding member and a securing member pivotably coupled to a first end of said first holding member and secured to a second end of said first holding member.

6. The carrier according to claim 5, wherein said securing member is secured by aligning a pair of apertures through said second end of said first holding member with an aperture of said securing member and inserting a locking mechanism therethrough.

7. The carrier according to claim 6, wherein said securing member includes a C-shaped bracket and an extended portion having said aperture being aligned with said pair of apertures of said first holding member, wherein said C-shaped bracket in combination with said first holding member enclose said at least one article stabilizer in said secured position.

8. The carrier according to claim 7, wherein said at least one article stabilizer includes a pair of resting plates joined in a general V-shape to mitigate sliding of said at least one article between said resting plates.

9. The carrier according to claim 1, wherein said resistive member includes a gas shock having a pressure in a range of 120–250 pounds per square inch.

10. The carrier according to claim 5 further comprising an extension coupled to said first holding member to enable the carrier to support an additional article, said extrusion including a second holding member having a first end and a second end, wherein said first end of said second holding member is coupled to said second end of said first holding member, and a second securing member coupled to said first and second ends of said second holding member.

11. The carrier according to claim 10, wherein said extension further comprises at least a second article stabilizer disposed on said second holding member such that, when said second securing member is coupled to said second holding member, said second article stabilizer is fully enclosed by said second holding member and said second securing member.

12. The carrier according to claim 11, wherein said second securing member of said extension includes a bracket member having a connecting portion inserted into an opening at said second end of said second holding member for coupling said bracket member to said second holding member and a horizontal portion having an aperture aligned with said pair of apertures through said second end of said first holding member.

13. A carrier adapted for use with a vehicle having a receiver, said carrier comprising:

a base member having a first end removably coupled to the receiver of said vehicle and a second end;

an article support member placed in an upright position during transport, said article support member including a support column rotatably coupled to said base member intermediate to said first and second end of said base member, wherein said support column is generally orthogonal to said base member when placed in said upright position, and a first holding member coupled to said support column, said first holding member supports said at least one article during transport;

a securing member pivotably coupled to a first end of said first holding member and is secured at a second end of said first holding member, said securing member encloses a portion of said at least one article between said first holding member and said securing member to prevent removal of said at least one article from said carrier; and a resistive member coupled to said base member between said support column and said second end of said base member, said resistive member resists rotation of said article support member in a downward rotational direction from said upright position by applying a force in a direction generally opposite said downward rotational direction against said support column to prevent said article support member from abruptly rotating downward from said upright position.

14. The carrier according to claim 13, wherein said resistive member is a gas shock.

15. The carrier according to claim 14, wherein said base member is oriented in a generally horizontal direction when coupling the carrier to the vehicle.

16. The carrier according to claim 13, wherein said securing member includes a bracket rotatably coupled to said first end of said first holding member so as to remain generally planar to said first holding member.

17. The carrier according to claim 16 further comprising an extension to enable the carrier to support at least one additional article, said extension including (i) a second holding member having a first and second ends wherein said first end of said second holding member is removably coupled to said second end of said first holding member and (ii) a second securing member removably coupled to said second end of the second holding member.

18. A carrier adapted for use with a vehicle having a receiver, said carrier comprising:

a base member having a first end adapted to be inserted into the receiver and a second end;

an article support member coupled to said base member intermediate to said first and second ends of said base member, said article support member supports at least one article through at least one article stabilizer, said article support member including a support column generally orthogonal to said base member when placed in an upright position and a first holding member generally planar to said support column;

a stopping device, mounted on said stationary member, to prohibit further movement of the support column in a downward rotational direction once the support column makes contact against a front surface of said stopping device;

a securing member pivotably coupled to a first end of said first holding member and is secured to a second end of said first holding member, said securing member encloses a portion of said at least one article between said first holding member and said securing member to prevent removal of said at least one article from said carrier; and a resistive member to resist rotation of said article support member in the downward rotational direction from said upright position, a first end of said resistive member being coupled to said base member between said article support member and said second end of said base member and a second end of said resistive member being coupled to said support column, wherein said resistive member applies a force in a direction opposite said downward rotational direction directly against said support column to prevent said article support member from abruptly rotating downward from said upright position.

19. The carrier according to claim 18, wherein said resistive member is a gas shock applying the force between 120 and 250 pounds per square inch against said support column.

20. The carrier according to claim 19 further comprising an extension removably coupled to said first holding member, said extension enables the carrier to support at least one additional article, said extension including a second holding member coupled to said second end of said first holding member and a second securing member removably coupled to one end of the second holding member.

* * * * *